United States Patent [19]

Anders

[11] 4,289,410
[45] Sep. 15, 1981

[54] WORM FEED EXTRUDER FOR PROCESSING SYNTHETICS, RUBBER AND LIKE MATERIALS

[75] Inventor: Dietmar Anders, Hanover, Fed. Rep. of Germany

[73] Assignee: Hermann Berstorff Maschinenbau GmbH, Hanover Kleefeld, Fed. Rep. of Germany

[21] Appl. No.: 107,046

[22] Filed: Dec. 26, 1979

[30] Foreign Application Priority Data

Dec. 23, 1978 [DE] Fed. Rep. of Germany ....... 2856097

[51] Int. Cl.³ .............................................. B29B 1/10
[52] U.S. Cl. ......................................... 366/88; 366/79
[58] Field of Search .................. 366/79, 81, 82, 88, 366/89, 90, 75, 318, 319, 321, 322, 323; 425/208; 159/2 E; 100/117, 145; 198/664, 676, 677

[56] References Cited

U.S. PATENT DOCUMENTS

| | | | |
|---|---|---|---|
| 2,946,089 | 7/1960 | Heston | 366/76 |
| 3,904,179 | 9/1975 | Csongor | 366/89 X |
| 3,980,013 | 9/1976 | Bredeson | 425/208 X |
| 4,119,025 | 10/1978 | Brown | 100/145 X |
| 4,124,347 | 11/1978 | Miller | 425/208 |
| 4,202,633 | 5/1980 | Anders | 366/79 |

FOREIGN PATENT DOCUMENTS

2203331 8/1973 Fed. Rep. of Germany ...... 425/208

*Primary Examiner*—Philip R. Coe
*Attorney, Agent, or Firm*—Schwartz, Jeffery, Schwaab, Mack, Blumenthal & Koch

[57] ABSTRACT

In order to provide adaptability to a variety of material properties in a worm feed extruder for processing of synthetics or rubber, individual feed worm segments (7) and cylinder segments (10) surrounding the feed worm segments are provided at desired locations, the feed worm segments and cylinder segments being constructed divisible in the axial direction to enable these feed worm segments to be exchanged for feed worm segments of differing geometry. Removal of the cylinder (2, 3) or withdrawal of the feed worm (1) from the cylinder is thus avoided in the case where the feed worm is to be adapted to various material properties.

4 Claims, 2 Drawing Figures

WORM FEED EXTRUDER FOR PROCESSING SYNTHETICS, RUBBER AND LIKE MATERIALS

The invention relates to a worm feed extruder for the processing of synthetics, rubber, or like materials, having a cylinder and a rotatable feed worm mounted therein, the feed worm consisting of individual, vertically-divided segments which are arranged on a through-bolt or the like and biased against one another. A worm feed extruder is known from U.S. Pat. No. 2,946,089, which has a feed worm consisting of individual, vertically divided segments mounted on a through-bolt or the like and biased against one another by springs. When individual feed worm segments of this feed worm are to be interchanged, the feed worm itself must either be pulled out of the worm feed extruder in the feed direction, or, alternatively, the cylinder must be removed. After this, the through-bolt, which is normally screwed to the feed worm head, is detached and the individual, vertically divided feed worm segments can be exchanged one for the other or replaced by new segments.

It is the object of the present invention to offer a worm feed extruder in which individual feed worm segments can be exchanged entirely or partially in the most simple fashion, without requiring that the worm feed extruder itself be disassembled by removing the cylinder or pulling out the feed worm.

This object is attained with the present invention in that the feed worm segments are also formed entirely or partially centrally divisible in the axial direction of the feed worm and that the cylinder segments which radially surround the feed worm segments are formed centrally divisible in the same width or slightly greater width in the axial direction of the feed worm.

The feed worm segments centrally divided in the axial direction of the feed worm are screwed to one another.

In a further refinement of the invention, the cylinder segments which are centrally divisible in the axial direction of the feed worm are constructed recessed stepwise in order to attain a better sealing of the cylinder at these locations.

Ring flanges for mounting tensioning bolts secured by turn screws are provided on those cylinder parts against the end faces of which lie the centrally divided cylinder parts. Thus, the centrally divisible cylinder parts are clamped between the individual cylinder parts in order to attain an outstanding seal.

The advantages provided by the invention lie particularly in that, when exchanging individual feed worm segments, the feed worm must neither be withdrawn from the worm feed extruder nor must the extruder cylinder be removed.

By simply releasing the tensioning screws, the centrally divided cylinder segments can be removed in order to reach the feed worm segments. Then the screwed junction of the feed worm segments is released and one half of the centrally divided segment can be removed from below and the other half removed from above from the feed worm segment and replaced with another segment having, for example, a different pitch or screw web depth. After that, the two cylinder halves which surround this segment need simply be again placed in the step-wise recessed, adjacent cylinder parts and tensioned by means of the tensioning bolts engaging the ring-shaped flanges.

An embodiment of the worm feed extruder in accordance with the invention is described in greater detail below with reference to the drawings which show a de-gasifying extruder.

Figure 1:
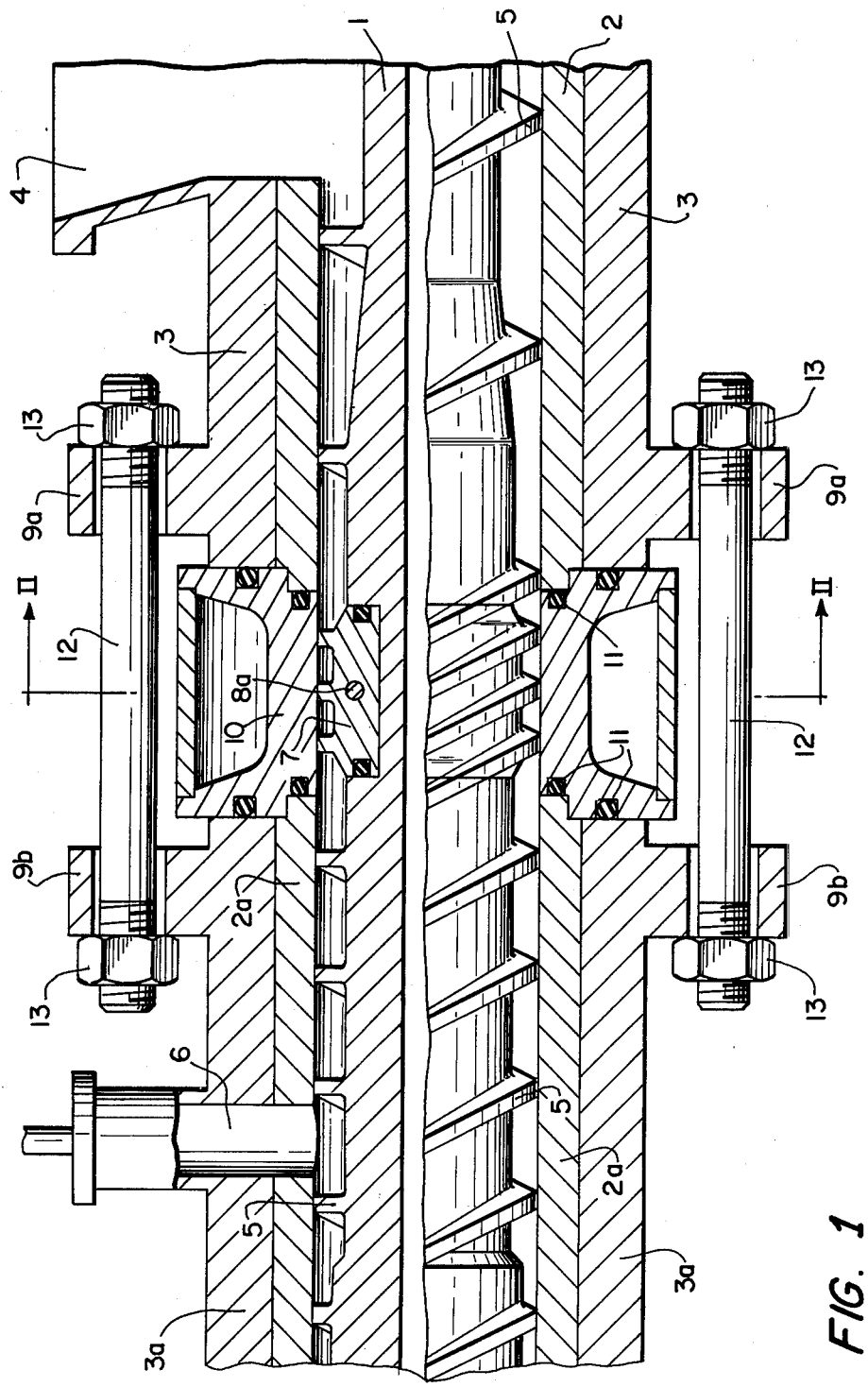
FIG. 1 shows a longitudinal section through a de-gasifying extruder of this type.

A feed worm 1 is arranged within an inner cylinder 2. Arranged around the inner cylinder 2 is an outer cylinder 3. The material to be processed is placed in the feed hopper 4 and is conveyed by the screw web 5 on the feed worm in the direction of the discharge opening of the worm feed extruder.

The feed worm 1 shown in FIG. 1 has an interchangeable feed worm segment 7 which is centrally divided and consists of two parts 7a and 7b.

Figure 2:
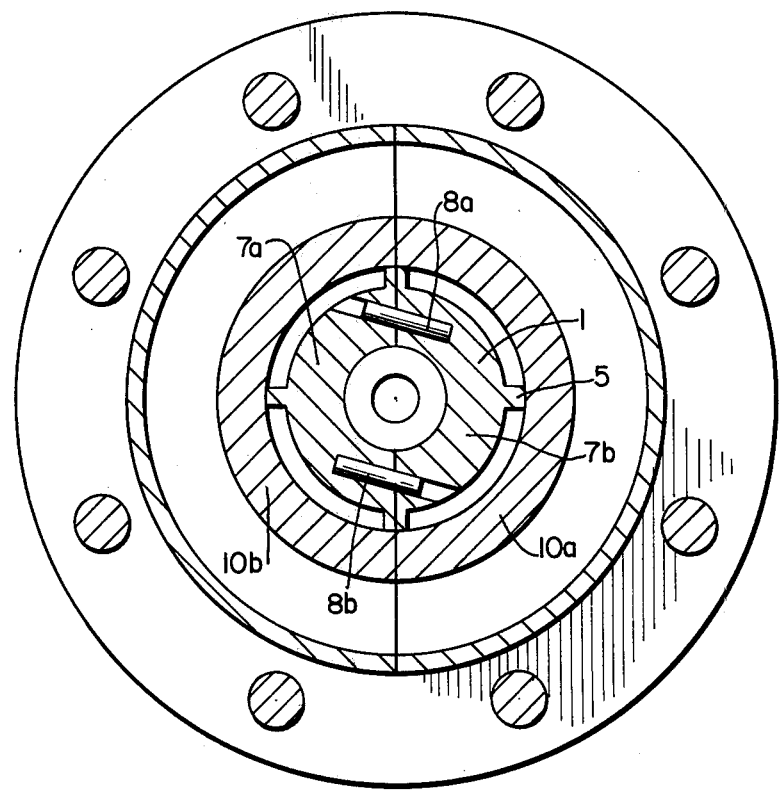
FIG. 2 shows a cross-section taken along line II—II in FIG. 1.

As can be seen from FIG. 2, parts 7a and 7b are constructed so that they may be screwed to one another by screws 8a and 8b. The centrally divided feed worm segment 7 can thus be removed by simply releasing screws 8a and 8b from the feed worm 1, and can be replaced by another segment having a different screw pitch or screw web depth, or even by a back pressure ring or a member having multiple screw threads.

The extruder cylinder consists of the inner cylinder parts 2 and 2a, and the outer cylinder parts 3 and 3a. Ring-shaped flanges 9a and 9b, are provided on the outer cylinder parts 3 and 3a. Arranged between cylinder parts 2, 2a and 3, 3a is the centrally divided cylinder part 10 consisting of members 10a and 10b.

The centrally divided cylinder part 10 is constructed stepped on both of its end faces in order to assure a better seal. In addition, sealing rings 11 are provided on the end faces.

The centrally divided cylinder parts 10a and 10b are inserted between cylinder parts 3, 3a and 2, 2a and held by means of tensioning bolts 12 which engage ring-shaped flanges 9a, 9b and which are put under pressure by turn screws 13. Cylinder parts 3 and 3a are thus pressed firmly against the centrally divided cylinder part 10, whereby a good seal is attained in a simple manner.

Description of the procedure for interchanging feed worm segments:

First, the turn screws 13 are released from the tensioning bolts 12, relieving the compressive force on the end faces of the centrally divided cylinder parts 10. These parts may thus be easily removed. Subsequently, the screws 8a and 8b are released so that the centrally divided feed worm segments 7 can be removed and replaced with other segments.

The exchange of individual feed worm segments is thus very easily effected, without having to withdraw the feed worm from the worm feed extruder or remove the cylinder from the feed worm.

The worm feed extruder shown in FIG. 1 is provided with a de-gasification opening 6. The technological advantage of the present invention will now be explained in detail by way of example, for a de-gasifying type worm feed extruder. A back-pressure member 7, which is constructed as a centrally divisible feed worm element, arranged upstream of a de-gasification opening 6 provides that only as much material reaches the downstream feed worm section in the region of the de-gasification opening as the following feed worm segments can convey without having the screw threads in the region of the de-gasification zone filled full.

Since the feed capacity of the following feed worm zones depends not only on the rotational velocity but also on the particular discharge nozzle resistance, it can happen, especially with low rotational velocity and high discharge orifice resistance, that the fluid material will back up into and flood the de-gasification zone, rendering the de-gasification zone non-functional.

In such case, the feed capacity of the first zone must be limited by employment of a flat-cut feed worm segment or a back pressure ring, so that the desired throughput requires a higher feed worm rotational velocity, whereby a higher possible feed capacity and, thus, a greater pressure capacity requirement results for the downstream zones.

If, in such case, the back pressure member, that is, the part 7 of the de-gasifying extruder, is not exchanged for a member which develops a lower back pressure, the operational efficiency of the feed worm becomes questionable.

In accordance with the invention, exchange of the feedworm segments 7, which limits the discharge capacity of the first feedworm section, is made very simple without requiring that the entire worm feed extruder be disassembled.

The interchange of individual feed worm components at particular locations in the worm feed extruder further offers the advantage that the worm feed extruder can be easily adapted to the processing of a greater variety of materials. When, for example, a high-temperature-sensitive material is to be processed in the worm feed extruder, individual portions of the feed worm which cause a high shearing effect and thus a temperature rise of the material, can be exchanged for feed worm components which assure gentler material treatment, for example, feed worm components having more deeply cut screw webs.

The advantages of the worm feed extruder in accordance with the invention are considered to be especially great for worm feed extruders having very large feed worms, for homogenization of high pressure polyethylene, having a diameter of 600 mm. Extruders of this type can have a length up to 20 m. It is apparent that the interchange of a feed worm having a length of 20 m and a diameter of 600 mm is highly problematical and complicated. Removal of the extruder cylinder is prohibitive with such large extruders, if only because tempering apparatus is mounted on the individual cylinder parts, and such tempering apparatus must also be disassembled when removing the extruder cylinder.

When a worm feed extruder with such dimensions is outfitted with interchangeably-constructed feed worm and cylinder parts at critical locations, such as upstream of de-gasification openings, the adaptability of the worm feed extruder to particular operating conditions is very economical and may be effected without a great expenditure of time. The greater adaptibility of the feed worm is especially of great significance because the feeding capacity of feed worms of this type cannot be mathematically determined with great certainty.

I claim:

1. A worm feed extruder for processing of synthetics, rubber, and like materials, comprising:

a cylinder; and a feed worm arranged within said cylinder for rotation about a longitudinal axis, said feed worm being divided transversely to said longitudinal axis into a plurality of worm segments, said plurality of worm segments being mounted on a through-bolt extending along said axis;

wherein at least one said worm segment is centrally divided in the direction of said longitudinal axis into worm segment parts, said cylinder is divided transversely to said longitudinal axis into a plurality of cylinder segments, and at least one cylinder segment surrounding and extending the length of said at least one worm segment in the direction of said longitudinal axis is centrally divided in the direction of said longitudinal axis into cylinder segment parts, whereby said at least one worm segment may be removed from said cylinder without removing all of said plurality of feed worm segments from said cylinder.

2. A worm feed extruder according to claim 1, further comprising means for fastening together said worm segment parts of said at least one centrally divided worm segment.

3. A worm feed extruder according to claim 1, wherein said at least one centrally divided cylinder segment has end faces, said end faces having step-wise recesses for engaging end faces of adjacent said cylinder segments.

4. A worm feed extruder according to claim 1, wherein said at least one centrally-divided cylinder segment is disposed between adjacent said cylinder segments, said adjacent cylinder segments having flanges extending radially outwardly of said longitudinal axis, further comprising tensioning means for engaging said flanges to bias said adjacent cylinder segments against said at least one centrally divided cylinder segment.

* * * * *